Patented Aug. 9, 1927.

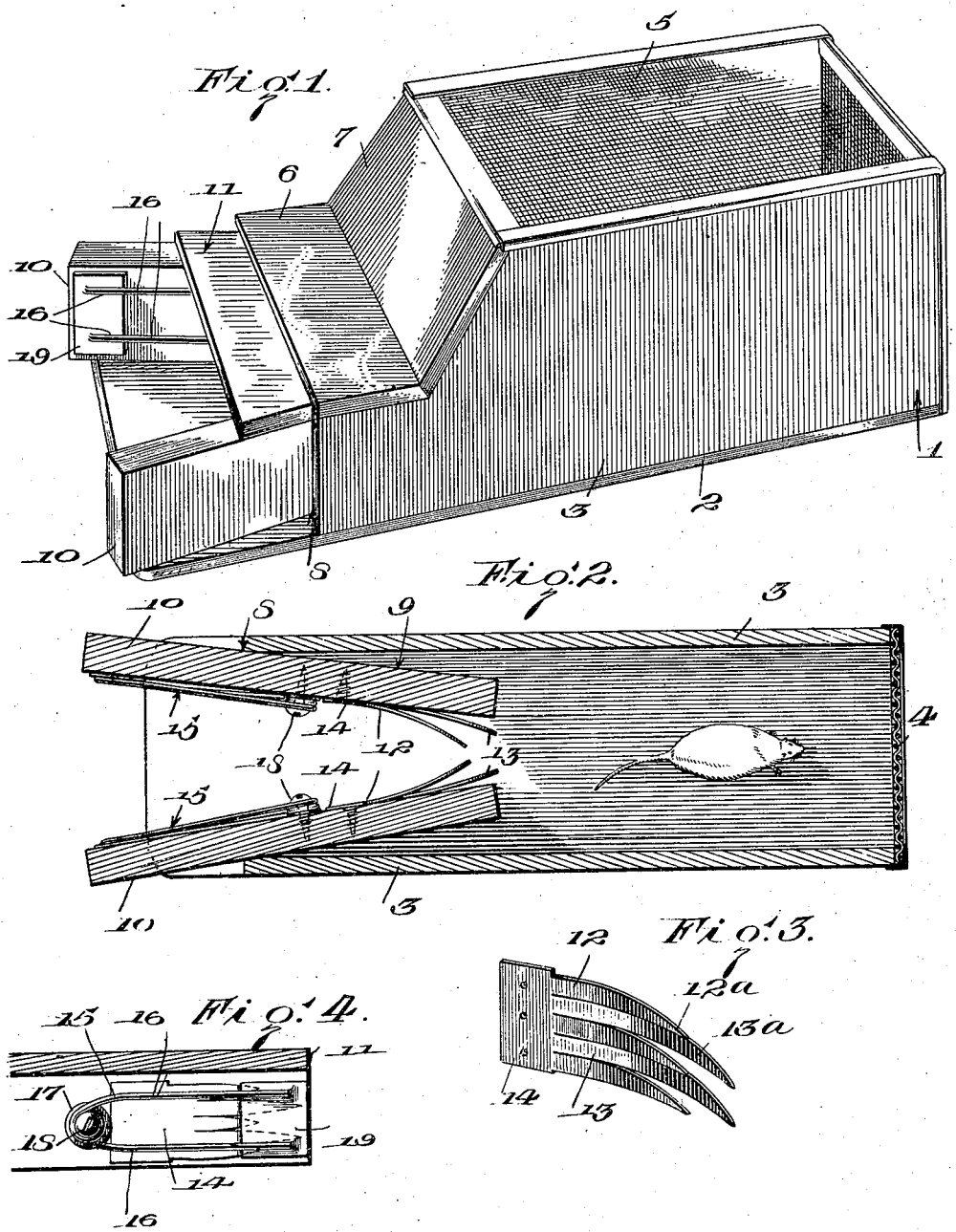

1,638,767

UNITED STATES PATENT OFFICE.

WILLIAM I. HARMON, OF LANGLEY, WASHINGTON.

ANIMAL TRAP.

Application filed January 30, 1925. Serial No. 5,845.

This invention relates to an improvement in animal traps especially designed for catching rats and mice.

The object of the invention is the provision of a trap which is simple in construction and comparatively inexpensive to manufacture and in which there is no trigger mechanism or other complicated elements to get out of order.

A further object is the provision of a trap of this character which is effective to entice and trap even the most wary mice and rats and which is so constructed and organized that the animals cannot rob the trap without being caught.

A further object is the provision of a trap of such construction as to facilitate the entrance of the animals and yet absolutely prevent their escape.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view of one embodiment of the invention,

Figure 2 is a view in horizontal section,

Figure 3 is a detail perspective view of the fingers employed at the entrance of the trap for preventing the escape of the animals, and Figure 4 is a fragmentary view partly in section and partly in elevation showing the means employed for holding the fingers in inoperative position.

Referring to the drawings, the numeral 1 designates generally a container which may be made of suitable material and which includes a bottom 2, side walls 3, an end wall 4 and a top wall 5. The end wall 4 and top wall 5 may be made of wire mesh. At the forward end of the trap the side walls are reduced and have plates 6 and 7 fastened thereto so as to define an opening 8 leading into the interior of the trap.

A frame, designated generally at 9, is provided and includes a pair of rigid side bars 10 fastened on the bottom of a top plate 11, the side bars 10 inclining toward each other and converging inwardly of the trap and having their inner ends spaced, whereby the side bars define an entrance leading into the trap. The top plate 11 precludes any possibility of escape of animals that have entered the trap. The bottom 2 of the container is flat and smooth and provides a runway into the trap of such a character as to afford a sure footing for the animals and encourage their entrance into the trap. The frame 9 is inserted in the opening 8 and the side bars 10 are frictionally engaged with the reduced forward ends of the side walls 3 to hold the frame in position. This has been found to be sufficient but if desirable fastening means may be employed for this purpose.

Means is provided for preventing the escape of animals from the trap while permitting their ready entrance thereinto and such means is preferably carried by the side walls 10 and consists of a plurality of short fingers 12 and a plurality of long fingers 13 on each side wall. The short fingers 12 and the longer fingers 13 of each wall may be stamped or cut from the same piece of metal and may be integrally formed with an attaching plate 14. The plates 14 are fastened to the side bars 10 so that one end of each finger is connected to the side bar on which it is mounted. The opposite end of each finger from that connected to the side bar is free and is pointed, as indicated at 12ª and 13ª, respectively. Intermediate their ends the fingers are bowed so that the fingers extend outwardly and toward each other. The fingers 12 are bowed more sharply than the fingers 13, the fingers 13 lying between the fingers 12 and the inner faces of the side bars 10. As shown in the drawings all of the fingers are narrow and elongated and these fingers are constructed of resilient or spring metal. By reason of these characteristics an animal may readily pass into the trap, the fingers yielding readily to permit entrance of the animals. After the animal has entered the trap its escape is prevented since the entrance is blocked by the pointed ends of the fingers 12 and 13. The fingers 13 prevent the animal from pressing the fingers 12 out of the way since these fingers 13 lie so close to the inner faces of the side bars as to prevent the animals from getting in the space between the fingers 12 and the side bars. Of course, suitable bait is placed within the housing or receptacle 1 to attract and lure the animals into the trap. Applicant has found that animals become wary of and avoid a trap after the same has been used for some time, and in order to overcome this deficiency common to all traps, applicant proposes to render his trap inoperative at times so that the animals may pass freely into and out of the same without injury. In fact, it has been found that the best results are achieved when some food is placed in the trap for the animals when the trap is inoperative. For this purpose a spring member, designated generally at 15, is pivotally mounted on each side bar 10, each spring member being constructed of resilient wire and having arms 16 united by a coil 17, the coil 17 being rotatably fitted on a pivot 18. A plate 19 is carried by the outer ends of the spring arms 16. When the spring members 15 are so disposed that their plates 19 occupy the position shown in Figure 1 the trap is operative and the spring members 15 are inactive. When it is desired to render the trap inoperative the plates 19 are grasped and the spring members flexed away from the side bars and rotatable through 180° to bring the plates 19 in position to engage the fingers 12 and 13 when the spring members 15 are released. When the spring members 15 have been released with the plates positioned as shown in Fig. 4, the spring members 15 urge the plates 19 against the fingers 12 and 13 and press these fingers 12 and 13 flush up against the inner faces of the side bars 10. This leaves the entrance to the trap unobstructed both in respect of ingress and egress, thereby robbing the animals of their acquired fear of the trap.

I claim:

1. In an animal trap, a receptacle having means defining an entrance, said entrance having side walls converging into the receptacle but having their inner ends spaced and a plurality of elongated resilient fingers carried by each side wall, each resilient finger having its outer end fastened to the side wall on which it is mounted and having its inner end free and pointed, the fingers being bowed so that their pointed ends lie closely adjacent to prevent egress from the receptacle, the fingers being readily flexed to permit ingress to the receptacle, and holding means co-operable with the fingers for maintaining the same flat up against the side walls of the entrance and inoperative when desired.

2. In an animal trap, a receptacle having means defining an entrance, said entrance having side walls converging into the receptacle but having their inner ends spaced and a plurality of elongated resilient fingers carried by each side wall, each resilient finger having its outer end fastened to the side wall on which it is mounted and having its inner end free and pointed, the fingers being bowed so that their pointed ends lie closely adjacent to prevent egress from the receptacle, the fingers being readily flexed to permit ingress to the receptacle, and holding means co-operable with the fingers for maintaining the same flat up against the side walls of the entrance and inoperative when desired, said holding means comprising a spring member pivotally mounted on each side wall of the entrance, each spring member having a plate engageable with the fingers of its side walls.

WILLIAM I. HARMON.